United States Patent
Wong (10) Patent No.: US 6,456,511 B1
(45) Date of Patent: Sep. 24, 2002

(54) START-UP CIRCUIT FOR FLYBACK CONVERTER HAVING SECONDARY PULSE WIDTH MODULATION

(75) Inventor: Chuck Wong, Union City, CA (US)

(73) Assignee: Tyco Electronics Corporation, Middletown, PA (US)

( * ) Notice: Subject to any disclaimer, the term of this patent is extended or adjusted under 35 U.S.C. 154(b) by 160 days.

(21) Appl. No.: 09/608,459

(22) Filed: Jun. 29, 2000

Related U.S. Application Data (63) Continuation-in-part of application No. 09/507,115, filed on Feb. 17, 2000, now abandoned.

(51) Int. Cl.[7] .............................................. H02M 3/335
(52) U.S. Cl. ...................................... 363/21.13; 363/49
(58) Field of Search ......................... 363/16, 20, 21.01, 363/21.12, 21.13, 49, 95, 97, 131

(56) References Cited

U.S. PATENT DOCUMENTS

| | | | |
|---|---|---|---|
| 3,818,311 A | 6/1974 | Mattson et al. | 321/43 |
| 3,873,846 A | 3/1975 | Morio et al. | 307/23 |
| 4,253,136 A | 2/1981 | Nanko | 363/21 |
| 5,289,101 A | 2/1994 | Furuta et al. | 320/21 |
| 5,436,820 A | 7/1995 | Furmanczyk | 363/49 |
| 5,661,642 A * | 8/1997 | Shimashita | 363/21 |
| 5,684,679 A | 11/1997 | Hong | 363/21 |
| 5,757,627 A | 5/1998 | Faulk | 363/21 |
| 5,812,383 A * | 9/1998 | Majid et al. | 363/21 |
| 5,815,380 A | 9/1998 | Cuk et al. | 363/16 |
| 5,880,942 A * | 3/1999 | Leu | 363/49 |

FOREIGN PATENT DOCUMENTS

| | | |
|---|---|---|
| DE | 40 07213 A1 | 9/1990 |
| EP | 0 744 818 A1 | 11/1996 |
| EP | 0 657 987 B1 | 3/1998 |
| GB | 2 230 114 A | 10/1990 |
| GB | 2 230 114 * | 10/1990 |
| GB | 2 081 989 A | 2/1992 |
| GB | 2 262 822 A | 6/1993 |
| JP | 6-205582 | 7/1994 |
| JP | 6-327248 | 11/1994 |
| JP | 7-213056 | 8/1995 |
| JP | 11-27941 | 1/1999 |
| JP | 11-69801 | 3/1999 |

OTHER PUBLICATIONS

International Search Report for International Application No. PCT/US01/04855 dated Sep. 12, 2001.
Patent Abstracts of Japan, vol. 016, No. 048(E–1163), Feb. 6, 1992 & JP 03251080 A (Ricoh Co. Ltd.) Nov. 8, 1991.

* cited by examiner

*Primary Examiner*—Matthew Nguyen (57) ABSTRACT

An output isolated, switching power supply has a transformer with a primary and two secondaries, an electronic switch in series with the primary, a first rectifier and filter on the first secondary to provide bias power during both startup and operating modes, and a second rectifier and filter on the second secondary to provide regulated output power. A resistor-capacitor network on the primary side provide an initial operating condition, such as a single control pulse, to the electronic switch which causes sufficient energy to be transferred through the first secondary to supply sufficient startup energy to operate a current control integrated circuit on the secondary side in a staged fashion. After the initial operating condition, the current control integrated circuit generates and applies a control signal to the electronic switch through an isolation circuit to cause the electronic switch to turn on and off in controlled fashion in order to deliver regulated power to the output of the supply. The low voltage, secondary side, current control integrated circuit provides a further aspect of the present invention.

24 Claims, 9 Drawing Sheets

1) Vg 5V 5uS
2) Vds 100V 5uS
3) Io (0.2A/div) 200mV 5uS

FIG. 8

1) Vg 10V 5uS
2) Vds 100V 5uS
3) Io (0.2A/div) 200mV 5uS

FIG. 9

1) Vg 10V 100uS
2) Vds 100V 100uS
3) Io (0.2A/div) 200mV 100uS

FIG. 10

START-UP CIRCUIT FOR FLYBACK CONVERTER HAVING SECONDARY PULSE WIDTH MODULATION

CROSS-REFERENCE TO RELATED APPLICATIONS

This application is a continuation-in-part application of commonly assigned application Ser. No. 09/507,115, filed Feb. 17, 2000, and now abandoned, the disclosure of which is incorporated herein by reference.

BACKGROUND OF THE INVENTION

1. Field of the Invention

The present invention relates to a switching mode power supply. More particularly, the present invention relates to a transformer-based flyback converter employing secondary pulse width modulation control and having a primary side start-up circuit powered by voltage supplied from the secondary side.

2. Introduction to the Invention

The present invention relates to electronic switching power supplies in high input voltage, low power applications, such as off-line battery charging circuits that require self-contained bias power derived from the input-side AC mains. For safety reasons it is necessary to provide electrical isolation between the input mains and the output power of a switching power converter. In AC mains powered switching power converters, output isolation is conventionally accomplished by providing a transformer between the input side and the output side of the converter. The high voltage switching element and the pulse width modulation (PWM) control circuit are typically implemented on the primary side of the transformer. To regulate the output voltage or output current, or both, one or more feedback loops are provided for coupling control values from the output side to the input side control circuit. Due to the need for isolation, the feedback paths from output side to input side also have to be isolated. Isolation of the control values is frequently achieved by employing optical coupling via an optical isolator assembly, or by induction via a control transformer. The signal transmitted across the isolation barrier is usually an analog signal, and as such, is susceptible to noise and parameter drift due to temperature variation, distortion due to isolation circuit nonlinearities, and bandwidth limits of the isolation circuit or component.

Based upon the foregoing reasons, a secondary-side control circuit may be incorporated into a switching power supply. In using secondary-side control, the PWM control circuit is implemented entirely on the secondary side, while the electronic switch element is on the primary side. Since all output voltage or current sensing is carried out on the secondary side, there is no need to transfer analog control signals across the isolation barrier. Rather, the control circuit generates an on-off pulse-width-modulated control sequence which is coupled to the primary side switch element through a pulse transformer, for example. Because direct connection is made to the AC mains on the primary side, there is no power readily available at the secondary side PWM control circuit at start-up. Thus, special provision must be made to ensure that the power supply will begin switching when power is first applied via the AC mains.

Figure 1:
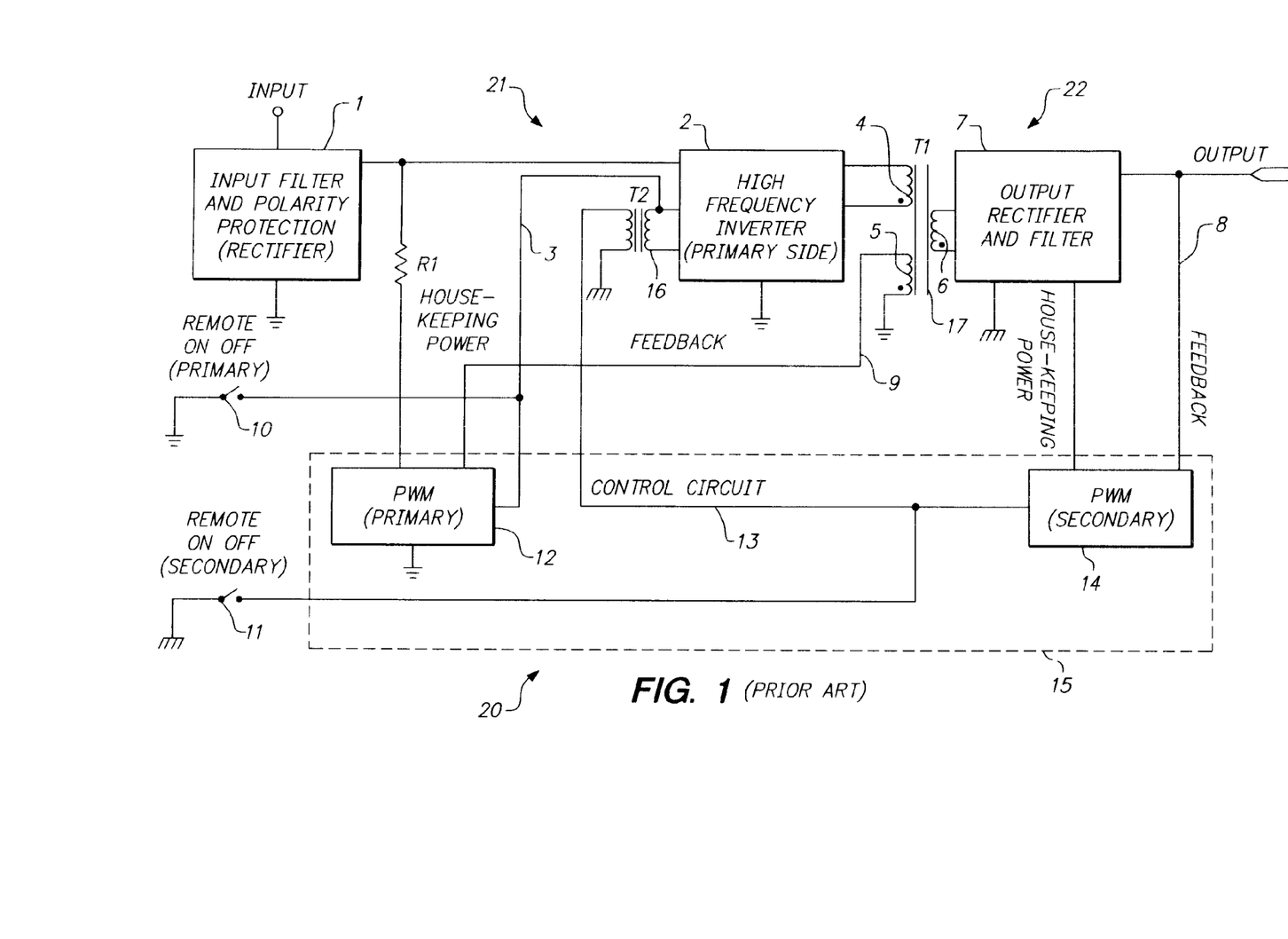
FIG. 1 is a functional block diagram of a conventional switching power supply using a primary side controller for startup and a secondary PWM controller for switching regulation.

FIG. 1 illustrates an example of a conventional switching power supply 20 having a secondary side control. The supply 20 includes an input side 21 and an output side 22, separated by a switching power transformer 17 having a primary winding 4 and two secondary windings 5 and 6. The primary winding 4 is connected to a high frequency inverter 2, which in turn is connected to an input filter and polarity protection (rectifier) circuit 1 in direct connection with the AC mains. During operation of the supply 20, a switching element within the converter circuit 2 causes an alternating current to flow through the primary winding 4, and currents are induced in secondary windings 5 and 6. An output rectifier and filter circuit 7 is connected to the secondary side 6 and rectifies the induced AC power in order to provide DC power output at desired voltage and current levels.

In order to regulate the output of the circuit 7 to the desired levels a control circuit 15 is provided. In the FIG. 1 example, the control circuit 15 includes a primary side control circuit 12 which generates a startup switch waveform, and a secondary control circuit 14 which generates a PWM control signal regulated by feedback control. A pulse transformer 16 provides primary/secondary side isolation and couples the PWM control signal from the secondary control circuit 14 to the high frequency inverter circuit 2 via a control path 13. A primary side on-off switch 10 bypasses the primary control startup circuit 12, and/or a secondary side on-off switch 11 bypasses the secondary control circuit 14. Switches 10 and/or 11 may be provided to control startup and shutdown operations of the supply 20.

In order to provide initial startup, the primary control startup circuit 12 derives operating power through a resistor R1 from a DC bus between rectifier 1 and inverter 2. The primary control startup circuit 12 puts out square wave switching control signals over a path 3 to the inverter 2 which bypasses the pulse transformer 16 in order to control the high frequency inverter circuit 2 during startup. After startup, a feedback signal from the secondary winding 5 will cause the primary control circuit 12 to stop sending the square wave switching signals when sufficient energy is being transferred to the secondary winding 6 to operate the secondary control circuit 14. From this point on, the secondary control circuit 14 will take over all switching control of inverter 2 via control path 13 and feedback isolation pulse transformer 16. The secondary control circuit 14 performs conventional voltage regulation by comparing output voltage level with a predetermined reference in order to adjust the on-off duty cycle of the switching element of the high frequency inverter 2. Power transformer 17 is typically, although not necessarily, a step-down transformer. A low voltage induced in secondary winding 6 provides power to the output rectifier and filter circuit 7 which in turn provides a smooth, regulated DC voltage at the output.

Since there is no isolation component in a feedback control line 8 from the output to the secondary PWM control circuit 14, the limitations noted above with analog signal isolation are not present. However, startup power for the secondary control circuit 14 is more difficult to acquire, as compared with the conventional primary side control scheme, where the entire control circuit is present on the primary side of the power transformer. One typical approach is to include an electronics circuit to generate a PWM signal with a fixed frequency and duty cycle, or a square wave, in order to cause transfer of start-up power to the secondary control circuit 14. Since this start-up electronics circuit 12 is on the primary side, the components may be subject to high voltage stress from the AC mains, and a high voltage silicon integrated circuit process may be required to implement the start-up circuit 12.

From a reliability standpoint, it is desirable to limit silicon components on the primary side to rectifiers and the switching element in inverter 2. Other concerns and drawbacks include added cost and complexity to provide effective startup circuitry.

SUMMARY OF THE INVENTION

A general object of the present invention is to provide an isolated output, switching mode power supply which includes a simplified input side starting circuit and a low voltage output side integrated control circuit which overcomes limitations and drawbacks of prior approaches.

One more general object of the present invention is to provide an isolated output, switching mode power supply which includes a starting circuit employing self-oscillation during an initial startup interval and a low voltage output side integrated control circuit which takes over control of the starting circuit as soon as secondary side power becomes available, in a manner overcoming limitations and drawbacks of prior approaches.

A third general object of the present invention is to provide a switching mode battery charger circuit which starts up and operates reliably over a wide variety of AC mains voltages present throughout the world.

Yet a fourth general object of the present invention is to provide a low voltage integrated circuit for controlling a switching mode power supply from a secondary side of said power supply in a manner overcoming limitations and drawbacks of prior approaches.

In one aspect the present invention provides an isolated-output switching power supply having a transformer with a primary winding and at least one secondary winding. A first rectifier-filter rectifies and smoothes input power drawn from the AC mains. A series network including the primary winding and a source-drain path of a switching field effect transistor enables energy to be switched into a core of the transformer. A starting circuit including a first resistor-capacitor network is connected to apply a declining voltage level derived from the rectified input power directly to a gate of the transistor during initial power-on, so that the transistor conducts and transfers input power through the primary and into the core until a time constant of the resistor-capacitor network causes the transistor to stop conduction. When conduction through the primary winding stops, energy stored in the core is transferred to the secondary winding. A second rectifier and small value smoothing capacitor are connected to the secondary winding to produce an initial operating low voltage. An integrated control circuit chip is electrically configured and connected to receive and use the initial operating low voltage to begin generating and putting out switching pulses to the gate of the transistor through an isolation circuit so that regulated switching of the transistor occurs immediately after the transistor has stopped conduction in accordance with the initial declining voltage level. In this aspect of the invention the transformer most preferably has a second secondary winding and the power supply further includes a third rectifier for producing a second secondary voltage. A current-limiting network comprising a third capacitor, a first inductor, and a fourth smoothing capacitor initially isolates an output load from the second secondary winding during initial startup while thereafter filters and provides the second secondary voltage as regulated DC power to the load. As one more aspect of the present invention, an output level monitor is connected in a network including the second secondary winding and third rectifier, and the integrated control circuit chip is electrically connected to the output level monitor and regulates duty cycle of the switching pulses in relation to monitored output level of the power supply flowing to the load.

In another aspect of the present invention, an isolated-output switching power supply comprises a transformer having a primary winding and a secondary winding. A first rectifier rectifies input power from AC mains. A series network includes the primary winding and a source-drain path of a switching field effect transistor. A resonant circuit network is connected to a gate of the transistor to cause the transistor to self-oscillate (switch) during an initial power-on interval so that the transistor transfers input alternating current through the primary and into a core of the transformer. The energy stored in the core of the transformer thereupon is transferred to the secondary winding. A second rectifier and a small value smoothing capacitor are connected to said secondary winding to produce an initial operating low voltage. An integrated control circuit chip is electrically connected to receive and use said initial operating low voltage to begin generating and putting out switching pulses. An isolation circuit includes a pulse transformer having a secondary forming a part of the resonant circuit network and transfers the switching pulses to the gate of the transistor and causes the transistor to stop self-oscillation following the initial power-on interval.

In a related aspect of the invention, a low voltage switching current control integrated circuit is provided for use within a switching power supply having an input side isolated from an output side by a power transformer. The primary side includes a primary winding of the power transformer, a first rectifier and filter for rectifying and smoothing alternating current from power mains to provide primary direct current, a MOSFET switch having a source and drain current path in series with the primary winding and having a gate circuit, starting circuit means for causing the MOSFET switch to conduct initially and transfer energy into a core of the power transformer during an initial startup interval. The isolated secondary side includes at least a first secondary network having a first secondary winding and a second rectifier and filter for rectifying and smoothing said energy into a low level operating voltage. The low voltage current control integrated circuit generates control pulses for controlling the gate circuit upon receiving the low level operating voltage. The secondary side most preferably further includes a second secondary network having a second secondary winding and a third rectifier, isolator and filter for rectifying, initially isolating during the initial startup interval and then filtering and smoothing energy from the transformer into an output power for application to an external load. In accordance with this aspect of the present invention, the integrated circuit includes:

(a) a low level operating voltage monitoring circuit connected to monitor the level of operating voltage supplied from said first secondary network, (b) a linear filtering control circuit connected to add capacitance of an external capacitor to the second rectifier and filter as operating voltage level increases during the initial startup interval, (c) an output power monitoring circuit for monitoring the output power for application to the external load, and (d) a width-modulated pulse generator circuit for generating recurrent control pulses having widths controlled by monitored output power, the control pulses for application through an isolation circuit, such as a blocking capacitor and pulse transformer, to the gate of the MOSFET switch.

In this aspect of the invention the output power monitor circuit most preferably includes a voltage monitor and a current monitor.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

The invention is illustrated in the accompanying drawings, in which.

DETAILED DESCRIPTION OF THE INVENTION

Figure 2:
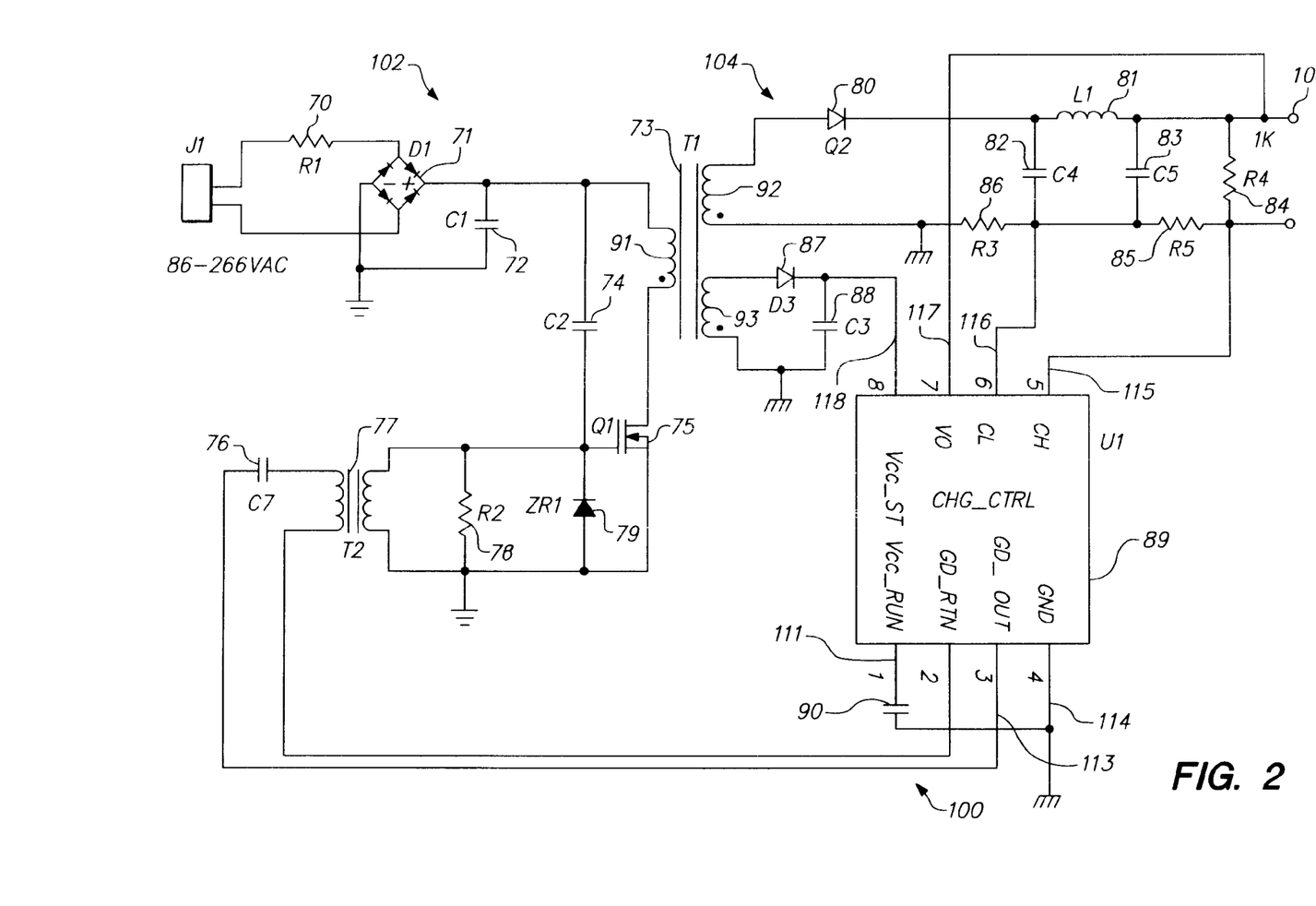
FIG. 2 is a functional schematic circuit and block diagram of a first preferred embodiment of an off-line switching power supply incorporating a control circuit in accordance with principles of the present invention.

With reference to FIG. 2, a switching power supply 100 in accordance with principles of the present invention includes a transformer 73 having a primary winding 91 on a primary side 102 and two secondary windings 92 and 93 on a secondary side 104. The primary side 102 includes a switching transistor 75, preferably an N-channel enhancement mode power metal-oxide-silicon field effect transistor (MOSFET), having a drain electrode connected to one side of the primary winding 91 and a source electrode connected to primary side ground return. The transistor 75 includes an insulated gate electrode having a capacitor 74 connected to a positive DC bus extending from an output of a full wave rectifier 71 and having a resistor 78 and a zener diode 79 connected to primary side ground return. The capacitor 74 provides initial charging current to the gate electrode. The resistor 78 enables the capacitor 74 to charge during startup. The zener diode 79 clamps the gate voltage to a safe level.

The secondary side 104 includes a rectifier diode 80 which rectifies current induced in the secondary winding 92. A network including capacitor 82, inductor 81 and capacitor 83 receives and filters the resultant DC and provides it as an output voltage at a terminal 106 for use externally, such as for charging lithium-ion battery cells. It should be noted that capacitor 83 provides the primary filtering and smoothing function, while inductor 81 and capacitor 82 limit the initial inrush current reaching the large value filter capacitor 83 during initial startup for reasons shortly explained. A current sense resistor 86 and a resistive divider network including resistors 84 and 85 provide current and voltage monitoring values to a charge control circuit 89.

A diode 87 is connected to rectify current induced in the second secondary winding 93 relative to secondary side ground, and a small value startup smoothing capacitor 88 is included to provide DC to the charge control circuit 89. The charge control circuit 89 is most preferably formed as a single monolithic silicon integrated circuit. The circuitry of the control circuit 89 is set forth in, and described in conjunction with, FIG. 3. In addition to a connection 118 to diode 87 and small value capacitor 88, the charge control circuit 89 includes an output voltage monitoring connection 117 to the output node 106, a current monitoring connection 116 to a node between resistors 85 and 86, and a constant current mode sensing connection 115 made to a node between the resistors 85 and 84. The circuit 89 also includes a grounding connection 114 to secondary side ground, and two control connections 113 and 112 to a winding of a pulse transformer 77 on the secondary side of the primary/secondary interface. A blocking capacitor 76 is in series with one of the control connections and the secondary side winding of transformer 77. The charge control circuit 89 also includes a connection 111 to a relatively high value smoothing capacitor 90 which also connects to secondary side ground.

At startup, since the initial voltage on capacitor 74 is zero because of the drain path through resistor 78, an inrush current flows into capacitor 74 with a magnitude sufficient to provide a conduction control potential at the gate of the MOSFET switch 75. The switch 75 is thereupon driven into conduction. During the initial ON period, primary current ramps up linearly until the MOSFET switch 75 is turned off. Turn off occurs after a time interval determined by a resistor-capacitor (RC) time constant established by capacitor 74 and resistor 78, when capacitor 74 becomes fully charged to the bus voltage appearing at the output of full wave rectifier 71 and the gate voltage of MOSFET switch 75 goes to zero with respect to primary side ground.

On the secondary side, diode 87 starts to conduct and the energy stored in the transformer 73 is transferred as initial DC operating current to the charge control circuit 89. The amount of energy stored in the transformer 73 is set by the RC time constant fixed by capacitor 74 and resistor 78 on the primary side. Since diode 80 is also conducting after the MOSFET switch 75 turns off, a portion of the stored energy is transferred to output capacitors 82 and 83. Because of the limited size of the magnetic core of a typical transformer design, the stored energy is relatively small. Accordingly, it is important to minimize the energy transfer to the main output capacitors to make more energy to be available for initial power up of the control circuit 89. For this reason, inductor 81 and capacitor 82 limit the initial energy delivered to capacitor 83. It should be observed that capacitors 82 and 88 are of small value and require relatively little energy to charge during the initial start up interval. Assuming they store equally the energy received from the transformer 73, the energy balance equation becomes:

$$\tfrac{1}{2} Lpri * Ip^2 = C3 * Vcc\_ST^2$$

where Lpri is the primary inductance of primary winding 91 of transformer 73, Ip is the primary current through winding 91 when MOSFET switch 75 turns off, C3 is the capacitance of initial filter capacitor 88 for secondary 93, and Vcc_ST is the threshold voltage level at which the control circuit 89 is activated.

In the event that the power supply output 106 sees a short or very low resistance to secondary side ground when primary power is first supplied to the power supply 100, the primary inductance is dramatically reduced in value to a leakage inductance level, and hence will not store sufficient energy to power up the control circuit via diode 87 and capacitor 88. Since the RC circuit of resistor 78 and capacitor 74 only operates once during a single power-on sequence, the MOSFET switch 75 will remain in its non-conducting or OFF state until power is removed, the short removed from the output 106, and the primary power re-applied. Thus, the RC-based start up circuit offers an added feature of self-protection against power-up fault conditions, such as a short at the output terminal 106 to secondary side ground.

Figure 3:
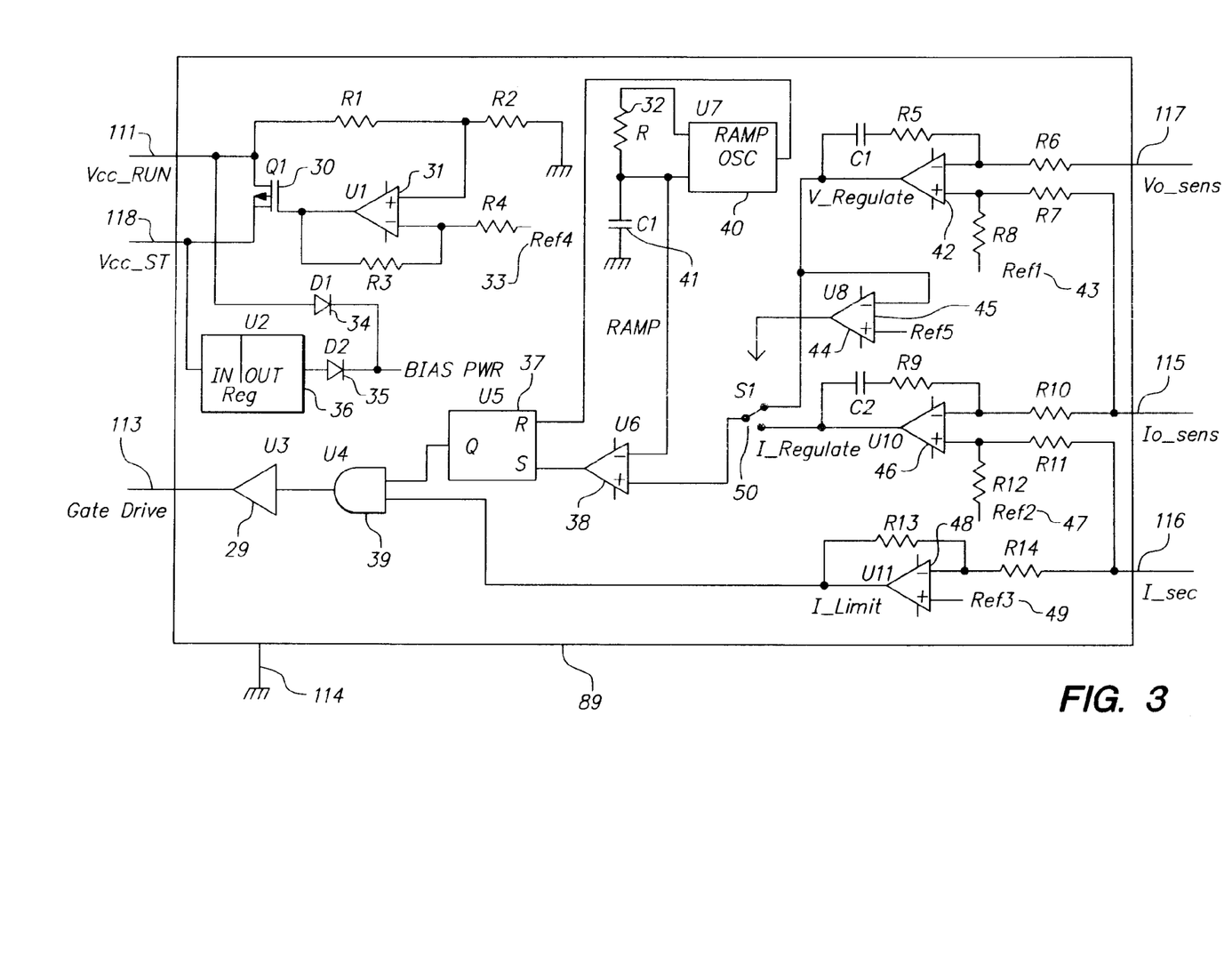
FIG. 3 is a functional schematic circuit and block circuit of the monolithic control circuit used in the FIG. 2 power supply.
Figure 4A:
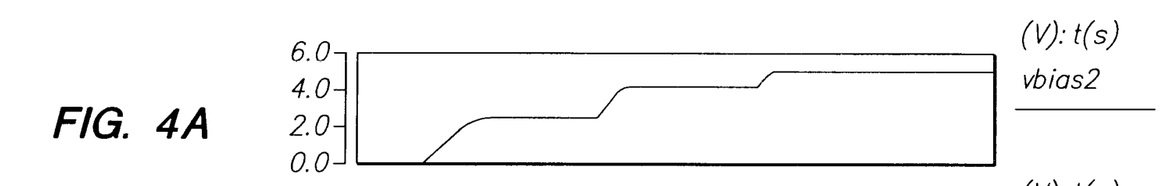
FIGS. 4(A) to 4(E) are a family of voltage and current waveforms plotted along a common horizontal time base illustrating startup mode and operating mode waveforms of the FIG. 2 circuit in response to a primary voltage of 120 volts, for example.
Figure 4B:
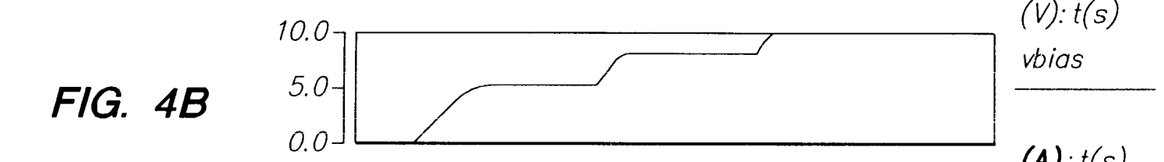
Figure 4C:
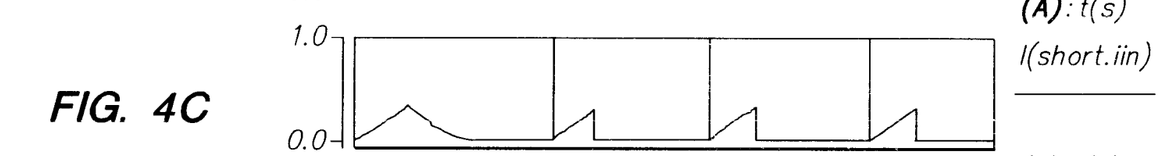
Figure 4D:
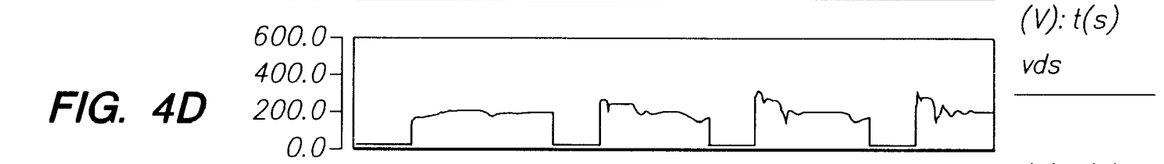
Figure 4E:
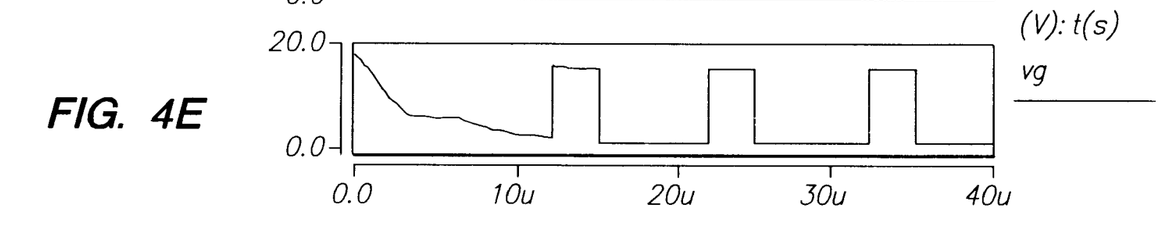
Figure 5A:
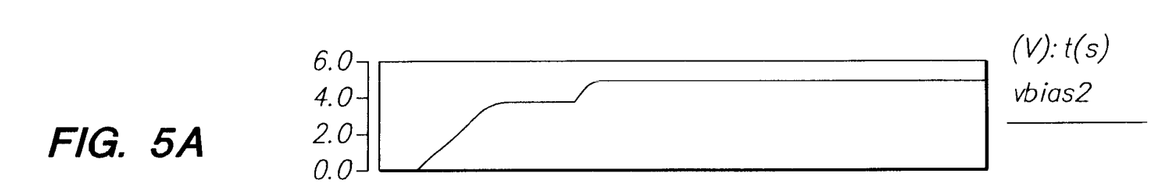
FIGS. 5(A) to 5(E) are a family of voltage and current waveforms, similar to the waveforms of FIG. 4, illustrating startup mode and operating mode waveforms of the FIG. 2 circuit in response to a primary voltage of 370 volts, for example.
Figures 5B, 5C:
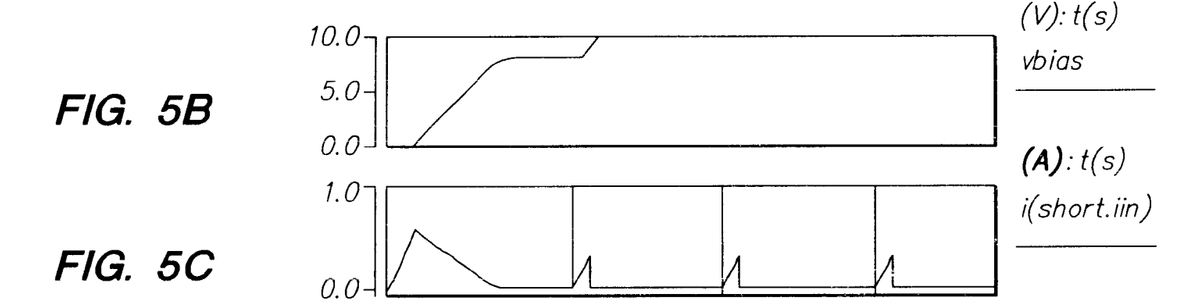
Figure 5D:
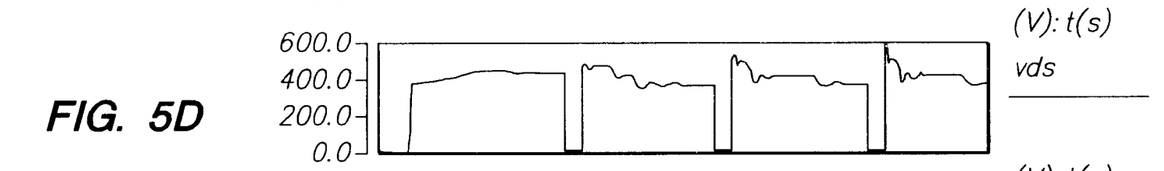
Figure 5E:
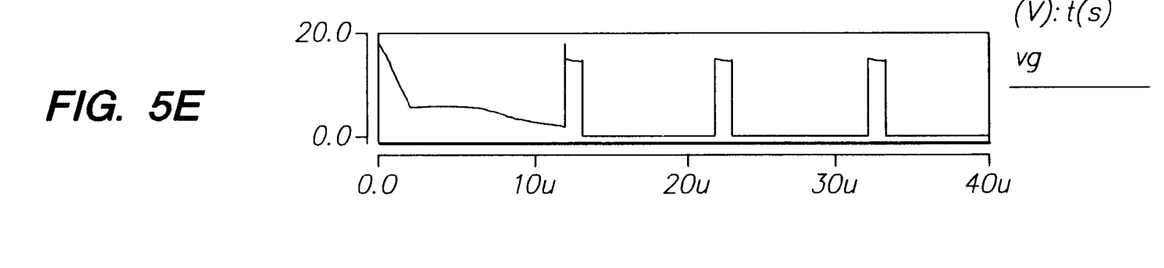

FIG. 3 illustrates in greater detail the structural and functional aspects of the charge control circuit 89 included within the FIG. 2 switching mode power supply. Since the charge control circuit 89 appears entirely on the secondary side 104 of the switching power supply, the circuit 89 may be fabricated as an integrated circuit at relatively low cost by using a low voltage integrated circuit design process, such as a 10 volts maximum design. As implemented, the charge control circuit 89 most preferably includes the circuit elements and connections as shown in FIG. 3, including on-board voltage reference regulators for supplying predetermined reference voltages 33, 43, 45, 47, and 49, respectively to on-board error amplifiers 31, 42, 44, 46, and 48. Initial power is applied to the starting connection 118 to activate the circuit 89. The PWM control signal being generated is transmitted to the gate of the switching MOSFET 75 on the primary side of the supply via induction through pulse transformer 77. As the switching MOSFET 75 switches into conduction, more energy is transferred to the secondary winding 93, and the larger value smoothing capacitor 90 at connection 111 is progressively added in parallel connection with the connection 118 via a FET 30 functioning as a linear regulator, thereby placing capacitor 90 in parallel with relatively low value capacitor 88 and providing more energy holding capacity for the charge control circuit 89 after startup.

An error amplifier 31 limits the current passing through transistor 30, thereby providing a linear regulator to regulate the charging current flowing into capacitor 90 in order to avoid discharging the charge being held in the relatively smaller value filter capacitor 88, thereby ensuring that the control circuit 89 remains effectively powered up during the startup sequence. As the larger value filter capacitors 83 and 90 begin to charge, power begins to be available for delivery at the output 106. Secondary voltage is sensed by the circuit 89 via the voltage sense connection 117 and internally compared within a reference amplifier 42 with an internal voltage reference level 43. The output of reference amplifier 42 is then compared to a voltage ramp generated by a ramp oscillator 40 within an error amplifier 38 to produce a logic level setting a flip-flop 37. The flip-flop 37 is reset upon flyback of the ramp oscillator 40. A resultant waveform comprises a pulse width modulation (PWM) control signal which is gated through AND gate 39 and amplified by a buffer amplifier 29 and supplied as the gate control signal on connection 113, through blocking capacitor 76 and the secondary of pulse transformer 77 to the gate of the primary side switching MOSFET 75.

The constant current sensing connection 115 is applied as an error voltage to one input of an error amplifier 46 and compared against a reference voltage, if a constant current regulation mode is selected in lieu of a constant voltage mode. Mode selection is made by an electronic switch 50. If constant current regulation mode is chosen, the regulation process is the same as followed in the constant voltage regulation mode.

Since there is no control or sensing circuit on the primary side of transformer 73, current limit and fault protection needs to be implemented on the secondary side of the power supply. The current sensing connection 116 detects the instantaneous secondary current, which is proportional to the primary current immediately after the primary side MOSFET switch 75 turns off. Since the PWM frequency and the maximum ON time are fixed, the worst case fault current can be detected after a maximum ON time control current rise. In a typical high frequency design, the maximum ON time is a few microseconds, and this brief period is sufficiently short to be withstood by most power MOSFET switching transistors. AND gate 39 gates the PWM control signal in relation to a maximum current level. Within the current control circuit 89, output current is sensed at the connection 116 and compared to a reference voltage 49 in an error amplifier 48 which puts out a current limit logic control which controls gating of the PWM control signal via the AND gate 39.

FIG. 4 presents a family of waveforms (FIGS. 4(A) to 4(E)) present within an embodiment of the FIG. 2 power supply circuit when the primary rectifier 71 puts out approximately 120 volts DC during an initial 10 microsecond startup interval and in an operating mode thereafter, out to the first 40 microseconds of circuit operation. Graph (A) of FIG. 4 plots regulated bias voltage within the charge control circuit 89 from an output of an on-board voltage regulator 36 from startup as measured at the pin 111 of circuit 89. Graph (B) plots unregulated bias voltage at the starting connection 118 and shows that the magnitude of unregulated bias voltage exceeds the regulated bias voltage of Graph (a) along the same startup timeline. Graph (C) plots current flowing through the primary winding of the main switching transformer 73. Graph (D) plots the drain-source voltage of the primary side switching MOSFET 75, while graph (E) plots the gate control voltage applied to the switch 75.

During the initial startup sequence, graph (E) of FIG. 4 shows that a single triangular control pulse is present at the gate of the switching MOSFET 75 for the first three or four microseconds. When the MOSFET 75 switches off, after approximately the first four microseconds, power is transferred from the core of the transformer 73 to the secondary winding 93 and a bias voltage begins to accumulate in capacitor 88 and reaches a sufficient magnitude to enable a first control pulse to be generated and put out at approximately 12 microseconds, with a duration controlled in relation to voltage sensed via connection 117. Bias voltage continues to increase; and following the second control pulse, ending at approximately 25 microseconds, bias voltage level reaches its nominal value, marking the end of the startup operating mode and the beginning of regular operating mode. FIG. 5 graphs (A) through (E) show the same startup and operating waveforms of the power supply 100 when the rectifier 71 initially puts out a much higher primary voltage, on the order of 370 volts DC, thereby showing that the power supply 100 effectively starts up and regulates its output power at relatively low primary voltages as well as at relatively high primary voltages. This also shows that the power supply 100 may be connected to a wide variety of mains voltages from approximately 100 volts to 240 volts AC, without requiring any manual circuit alterations or adjustments, thereby rendering the power supply 100 useful with the many voltage levels present throughout the world.

The specific component values of the power supply 100 are well within the ordinary skill level of those skilled in the art, and are not deemed necessary for a complete and useful understanding of the principles of the present invention.

It has been discovered that the start-up circuit 100 in FIG. 2 may not turn the MOSFET ON properly if the AC voltage is first applied to the circuit at a zero-crossing or at a near zero voltage value. Thus, proper operation may occasionally require that the unit 100 be plugged in or turned on several times before its intended functional operation commences.

Figure 6:
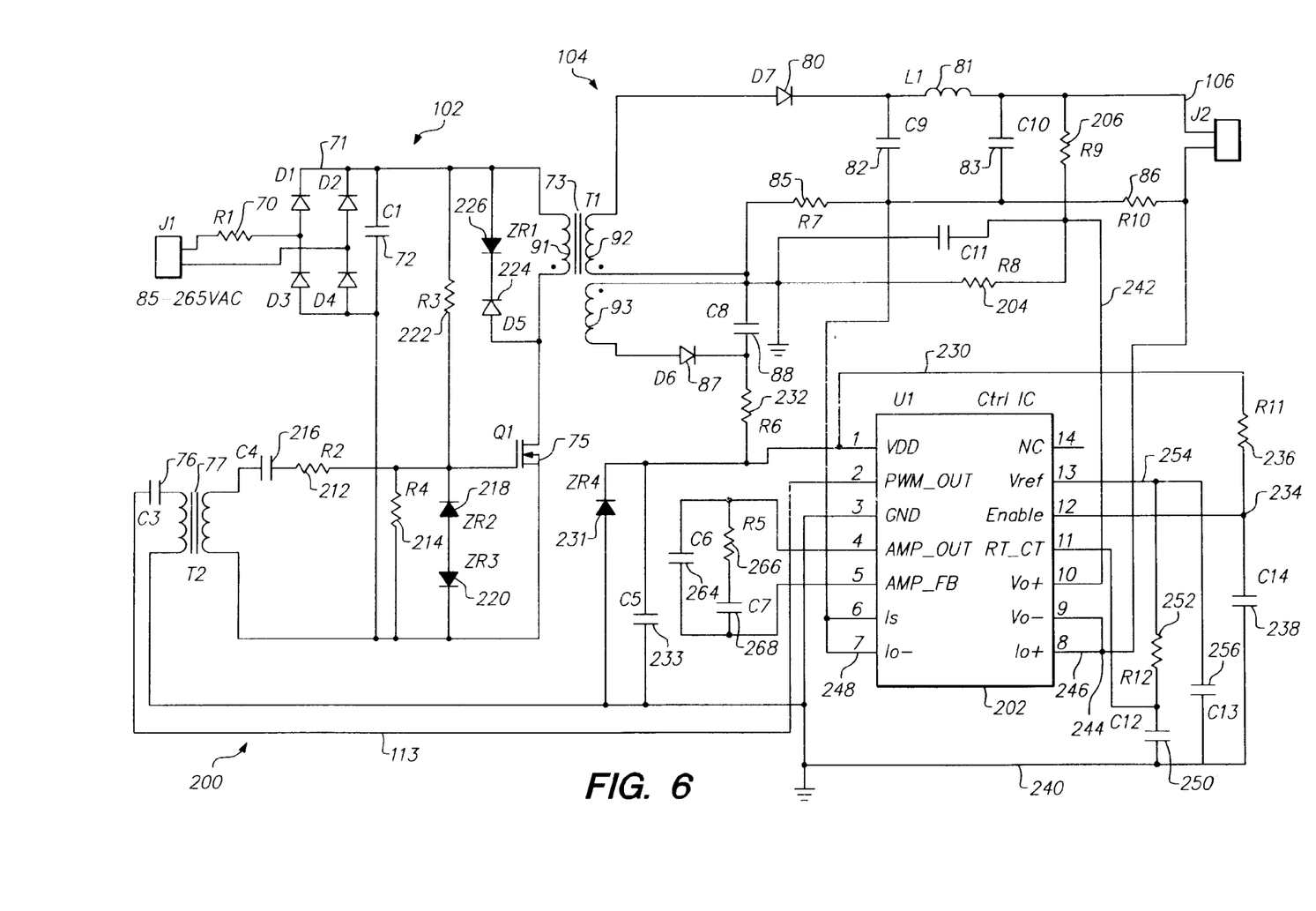
FIG. 6 is a functional schematic circuit and block diagram of a second preferred embodiment of an off-line switching power supply incorporating a control circuit in accordance with principles of the present invention.

An alternative start-up circuit 200 which overcomes the foregoing occasional limitation of the FIG. 2 circuit 100 is described in FIG. 6. Most preferably, although not necessarily, the circuit 200 provides an electrical charger for lithium ion batteries, for example. Electrical elements and components providing the same function as elements of the FIG. 2 circuit bear like reference numerals and are not more particularly described, except an as follows.

The circuit 200 consists of a power transformer 73 (T1) with a primary winding 91 and two secondary windings 92 and 93. One secondary winding 92 supplies the output power while the other secondary winding 93 provides bias power for the control IC 202. The circuit 200 uses a self-resonant technique to generate the initial power for the secondary IC 202. Similar to circuit 100 in FIG. 2, control functions are implemented on the secondary side of the power transformer 73, which is referenced to the output return of the charger circuit 200. Therefore, there is no isolation requirement for feedback signals. The output voltage is measured by a resistor divider network 204 (R8) and 206 (R9). The output current is measured by the shunt resistor 86 (R10). The current in the power secondary winding is measured by a resistor 85 (R7). Internal reference voltages are generated within IC 202 in order to regulate the output voltage or the output current, depending on the external battery charging requirement, for example. A PWM signal is generated and transmitted to primary side switching FET transistor 75 (Q1) on the high voltage side through pulse transformer 77 (T2). A level shifting capacitor 76 (C3) is used to eliminate the DC content of the PWM signal, ensuring proper operation of the pulse transformer 77.

During the start-up sequence, the primary side of the pulse transformer 77 (T2) (referenced to the secondary side of power transformer 73 (T1)) is an open circuit, since the PWM drive is in its high impedance state (for tri-state output) before the bias voltage is applied. As the DC bus 102 ramps up from zero to its final value, resistors 212 (R2) and 222 (R3), a capacitor 216 (C4), the secondary inductance of pulse transformer 77 (T2) and gate capacitance of the MOSFET 75 (Q1) form a resonant circuit. By properly choosing the values of these elements, the gate voltage of Q1 will resonate about its threshold voltage, turning the transistor ON and OFF. These elements are also chosen such that when the PWM drive is disabled (capacitor 76 (C3) is effectively connected across the primary winding of T2), the oscillation will stop and the DC offset on the gate of transistor 75 (Q1) is not high enough to turn the MOSFET 75 ON. This behavior ensures proper performance of the control circuit if a fault condition is sensed on the secondary side.

One important criterion for the secondary controller IC 202 is that the output buffer must be in its high impedance state before bias power is applied. This condition ensures that there is adequate inductance from pulse transformer 77 (T2) to activate self-resonance. If the controller output is in its low impedance state, the inductance becomes the leakage inductance of transformer 77 (T2), which is only about 5% of the open circuit inductance. This small inductance value will not activate resonance.

As the primary side starts switching, energy begins to transfer to both windings on the secondary side of the transformer 73. When the bias winding 93 receives enough energy to charge capacitor 88 (C8) to the minimum operating voltage of control IC 202 (U1), the PWM function starts. A PWM pulse is generated and transmitted to primary side switching MOSFET 75 (Q1) through pulse transformer 77 (T2). Capacitor 76 (C3) level shifts the PWM signal to prevent the DC voltage from saturating the pulse transformer 77. Zener diodes 218 (ZR2) and 220 (ZR3) limit the voltage that can be applied in either direction to the gate of switch 75 (Q1) to a magnitude of approximately 18V. A diode 224 (D5) and a zener diode 226 (ZR1) limit the voltage across the primary winding 91 of the power transformer 73 (T1).

There is no need to disconnect the start-up circuit after PWM control starts, since resistors 222 (R3) and 214 (R4) have resistances selected to present a high impedance. A small positive DC offset voltage is present on the gate of FET 75 (Q1) from the voltage divider circuit formed by resistors 222 (R3) and 214 (R4). During high duty cycle operation, this positive offset voltage will be cancelled by the negative offset produced by the transformer reaction (since the volt-second product in a cycle is zero). During low duty cycle operation, however, the negative offset voltage is not big enough to cancel the positive offset voltage, resulting in a net positive offset voltage at the gate of transistor 75. Therefore, one criterion for choosing values for resistors 222 (R3) and 214 (R4) is to ensure that at minimum duty cycle and maximum line voltage, the gate voltage is significantly below the threshold voltage, even though it is above zero volts.

Figure 7:
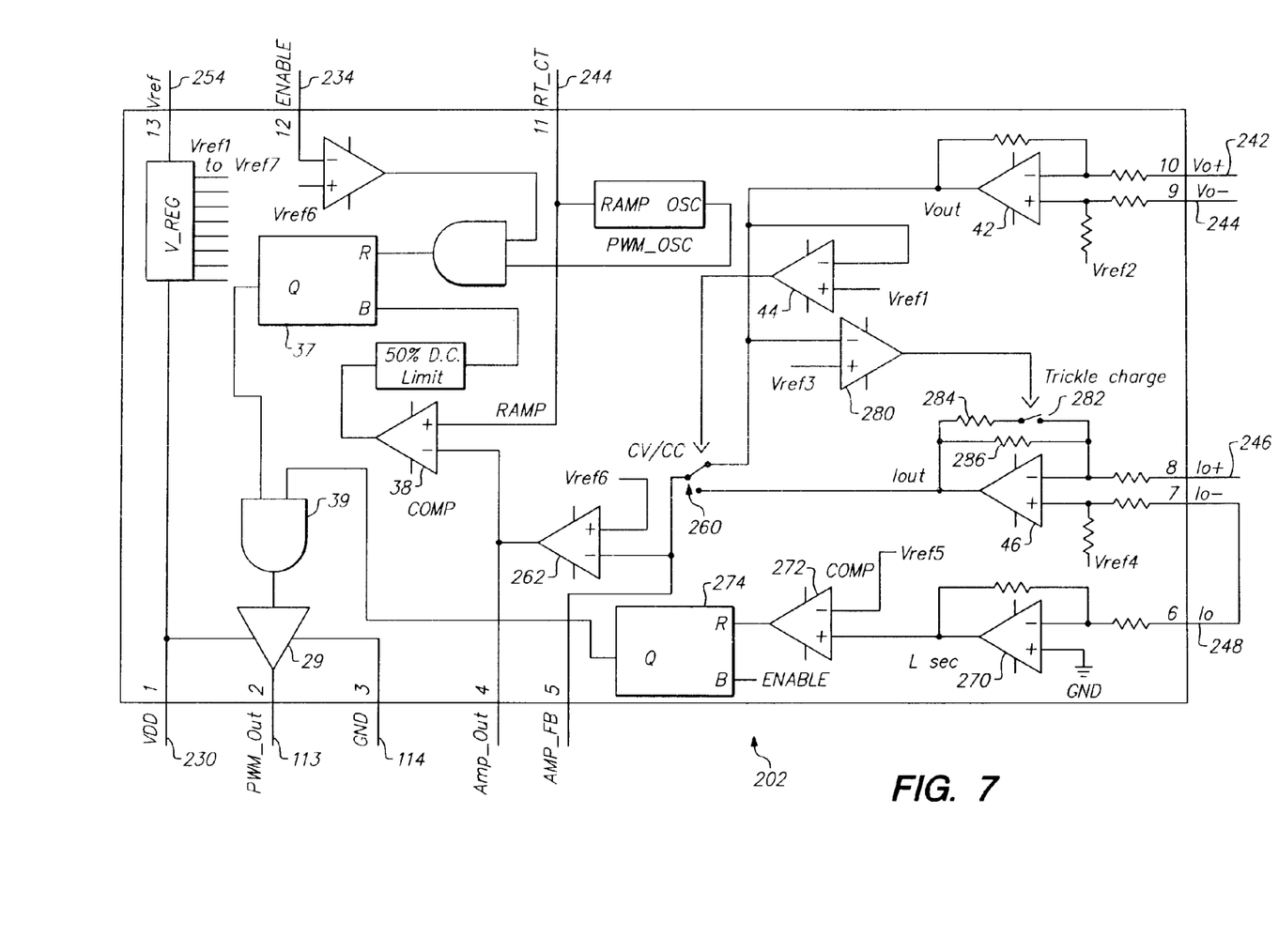
FIG. 7 is a functional schematic circuit and block diagram of the monolithic control circuit used in the FIG. 6 power supply.

FIG. 7 is a functional block diagram of the PWM control IC 202 of circuit 200 in FIG. 6. Power is initially supplied to a Vdd line 230 via a series resistor 232 from the bias voltage circuit comprising winding 93, diode 87 and capacitor 88. A maximum voltage level at the Vdd line 230 is maintained by a zener diode 231 (ZR4) and a smoothing capacitor 233 (C5). The IC 202 has an Enable line 234 connected to a node between a resistor 236 leading to Vdd 230 and a capacitor 238 leading to secondary side ground 240. The function of the Enable line 234 is similar to that of a conventional power-on reset function for digital circuits, which disables the output line 113 when the supply voltage is ramping up and the state of the logic is not set. When the voltage at the pin of the Enable line 234 reaches the minimum level, a PWM output is initiated on line 113 leading to capacitor 76 (C3) and primary of pulse transformer 77 (T2).

The cell voltage of an external cell being charged is sensed via the differential input lines 242 (Vo+) and 244

(Vo−) which connect between the voltage divider network 204 (R8) and 206 (R9) and the cell current return pin 244. The cell current is sensed via the differential input pair 246 (Io+) and 248 (Io−) which connect across output current sense resistor 86 (R10). The RT_CT line is connected to a RC circuit comprising a capacitor 250 (C12) to secondary side ground 240 and a resistor 252 (R12) to a reference voltage line 254 to establish an oscillating frequency for the PWM signal. An external capacitor 256 (C13) smoothes the internally generated reference voltage on reference line 254.

FIG. 7 shows a mode selection switch 260 that connects either the voltage feedback from voltage sense circuit 42 or current feedback signal from current sense circuit 46 to the error amplifier 262 to regulate either the output voltage or the output current, depending on the output requirement. The current sense circuit 46 includes a trickle charge function comprising a comparator 280, trickle charge switch 282 for adding a feedback resistor 284 across a feedback resistor 286 of current sense op amp 46. An operational amplifier 262 has characteristics externally controllable via output and feedback lines and external components, such as a parallel combination of a capacitor 264 (C6) and series network of a resistor 266 (R5) and capacitor 268 (C7).

Since there is no control or sensing circuitry on the primary side of circuit 200, cycle-by-cycle current limit is implemented on the secondary side. This operation is accomplished by sensing the secondary winding 72 current of power transformer 73, which is proportional to the primary current immediately after the MOSFET 75 is turned OFF. If a predetermined current level is exceeded, the controller IC 202 will disable the PWM drive signal on line 113 and not resume operation until after a power-on reset (Enable true) occurs. Therefore FIG. 7 also shows that IC 202 includes a current sense feedback function connected through line 248 to sense the transformer secondary winding current, Is, to accommodate this function. Internally, the IC 202 has a current to voltage conversion op amp 270, a comparator 272 which compares an output voltage of op amp 270 with a predetermined voltage reference, and a latch 274 which is set by the enable pulse and reset by the output of comparator 272. The output of latch 274 provides one input to AND gate 39.

Figure 8:
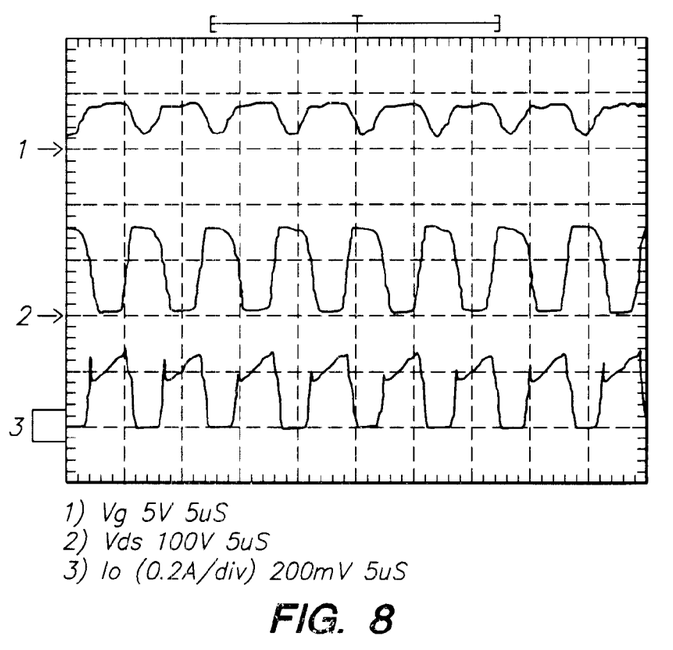
FIG. 8 is a family of voltage and current waveforms plotted along a common horizontal time base illustrating operation of the FIG. 6 circuit during a self-oscillating start-up period.
Figure 9:
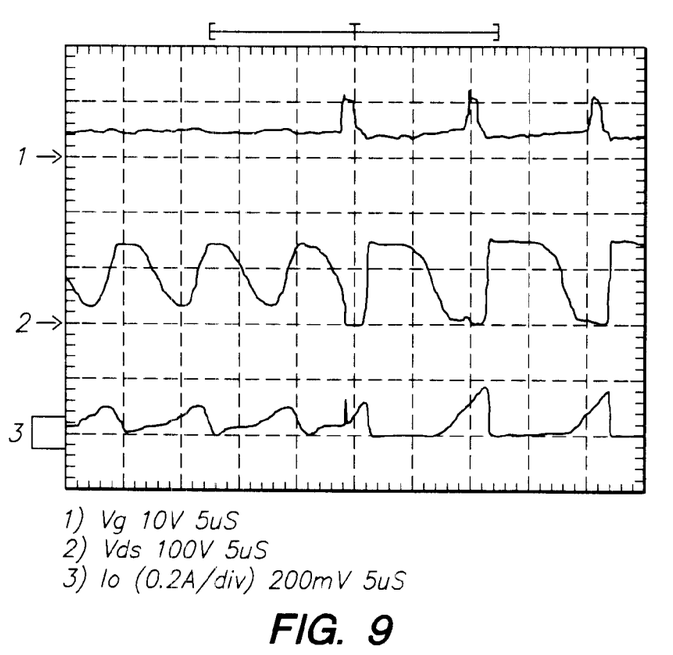
FIG. 9 is a family of voltage and current waveforms of the FIG. 6 circuit during the transition from self-oscillation to PWM control.
Figure 10:
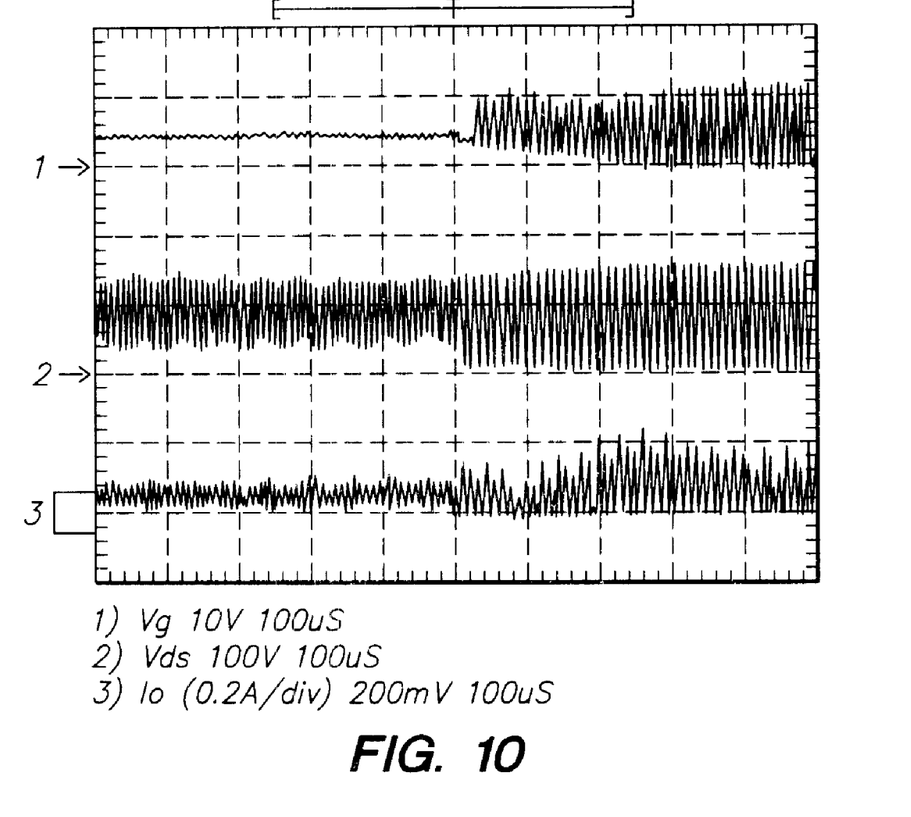
FIG. 10 is a family of voltage and current waveforms illustrating increase in bias voltage until a final value is reached as the FIG. 9 transition from self-oscillation to PWM control progresses.

The operation is described by the waveforms shown in FIG. 8 to FIG. 10, which includes three critical waveforms on the high voltage MOSFET 75: the gate voltage (upper trace 1), the drain-to-source voltage (center trace 2) and the drain current (lower trace 3). In FIGS. 8 and 9 the horizontal time axis is divided into 5 microseconds per division, while in FIG. 10, the time base is 100 microseconds per division. FIG. 8 shows the waveforms during the resonant self-oscillating start-up period. The gate voltage is oscillating about the threshold level, forcing the MOSFET 75 to switch at the resonant frequency.

FIG. 9 shows the waveforms during the transition from self-oscillation to PWM control. After the transition, since the bias voltage of the controller on the secondary-side has not reached its final value, the pulse amplitude (FIG. 9, trace 1) is just high enough to turn the MOSFET 75 ON and OFF. (Note that there is a significant dc offset voltage present on the gate because the duty cycle is small and the pulse amplitude is low.) As this transition progresses, the bias voltage increases and reaches its final value, as shown in FIG. 10.

Those skilled in the art will appreciate that many changes and modifications will become readily apparent from consideration of the foregoing descriptions of preferred embodiments without departure from the spirit of the present invention, the scope there of being more particularly pointed out by the following claims. The descriptions herein and the disclosures hereof are by way of illustration only and should not be construed as limiting the scope of the present invention.

What is claimed is:

1. A switching power supply for translating alternating current of a voltage source within a standard range of voltage supply mains into regulated power supplying a load, the regulated power being electrically isolated from the voltage supply mains, the power supply comprising:

first rectifier means for rectifying the alternating current into a first rectified current, when connected to the voltage supply mains, and having a positive output node and a return node, a series network including a primary winding of a first energy storing transformer means and a controlled electronic switching means connected across the positive output node and the return node, the first energy storing transformer means also having at least one secondary winding electrically isolated from the primary winding, the controlled electronic switching means having a control electrode, first network means connected to the control electrode, second rectifier means connected to the secondary winding for rectifying alternating energy stored in the first energy storing transformer means into a first secondary voltage, first capacitor means connected to store said first secondary voltage during an initial startup interval, control circuit means operated by the first secondary voltage and responsive to a control signal responsive to power supplied to the load for generating and putting out control pulses following the initial startup interval, and an isolation circuit for transferring the control pulses to the control electrode for controlling duty cycle of the controlled electronic switching means in relation to the control signal.

2. The switching power supply set forth in claim 1 wherein the first network means comprises second capacitor means connected from the positive output node to the control electrode, and first resistor means connected from the control electrode to the return node.

3. The switching power supply set forth in claim 1 wherein the first network means comprises a self-resonant circuit including a first inductor means and a second capacitor means connected to cause the controlled electronic switching means to self-oscillate during an initial start-up interval and to stop self-oscillating following said initial start-up interval.

4. The switching power supply set forth in claim 3 wherein the first inductor means comprises a secondary winding of a pulse transformer within the isolation circuit.

5. The switching power supply set forth in claim 1 wherein the controlled electronic switching means comprises an enhancement mode power insulated gate metal-oxide-silicon field effect transistor (MOSFET) having a source electrode, a drain electrode, and a gate electrode, said series network including the source electrode and the drain electrode and the control electrode comprising the gate electrode.

6. The switching power supply set forth in claim 2 wherein the controlled electronic switching means comprises an enhancement mode power insulated gate metaloxide-silicon field effect transistor (MOSFET) having a source electrode, a drain electrode, and a gate electrode, said series network including the source electrode and the drain electrode and the control electrode comprising the gate electrode, and wherein the second capacitor means and the first resistor means cause the MOSFET to conduct when power is first applied from the mains to the power supply for a period of time determined by a time constant established by respective values of capacitance and resistance of the first capacitor means and the first resistor means.

7. The switching power supply set forth in claim 6 wherein after initial conduction of the MOSFET ends, sufficient energy is transferred from the first transformer means and through the second rectifier means and stored in the second capacitor means to enable the control circuit to begin generating said control pulses under non-excessive operating power conditions at the load.

8. The switching power supply set forth in claim 1 wherein said first energy storing transformer means has a second secondary winding and further comprising third rectifier means for producing a second secondary voltage, and a current-limiting network comprising a third capacitor means, a second inductor means, and a fourth smoothing capacitor means for initially isolating said load from said second secondary winding during the initial startup mode and for thereafter filtering and providing said second secondary voltage as regulated DC power to said load.

9. The switching power supply set forth in claim 8 wherein the control circuit means includes DC voltage sensing means responsive to level of said second secondary voltage for providing said control signal.

10. The switching power supply set forth in claim 8 wherein the control circuit means includes output current sensing means responsive to a level of current flow through said second secondary winding for providing said control signal.

11. The switching power supply set forth in claim 10 wherein the output current sensing means includes trickle current switching means for enabling sensing of a plurality current flows through said secondary winding including a trickle current flow.

12. The switching power supply set forth in claim 8 wherein the control circuit means includes a maximum output current sensing and limiting means for limiting said control signal so that no more than a predetermined maximum output current flows to said load.

13. The switching power supply set forth in claim 1 wherein said first capacitor means has a relatively small capacitance value, further comprising third capacitor means having a relatively larger capacitance value, and wherein said control circuit means includes linear switching means for linearly switching the third capacitor means into a parallel connection with the first capacitor means when the control circuit has begun to generate said control pulses during the startup sequence.

14. The switching power supply set forth in claim 1 wherein the isolation circuit includes a pulse transformer having a primary winding connected to said control electrode and a secondary winding connected to said control circuit means.

15. The switching power supply set forth in claim 1 wherein said control circuit means is formed as a low voltage monolithic integrated circuit chip.

16. The switching power supply set forth in claim 1 comprising a lithium ion cell charger.

17. An isolated-output switching power supply comprising a transformer having a primary winding and a secondary winding, a first rectifier for rectifying input power from AC mains, a series network including the primary winding and a source-drain path of a switching field effect transistor, a first resistor-capacitor network connected to apply a declining voltage level derived from the rectified input power directly to a gate of the transistor at an initial power-on event so that the transistor conducts and transfers input power through the primary and into a core of the transformer until a time constant of the resistor-capacitor network causes the transistor to stop conduction, whereupon energy stored in the core of the transformer is transferred to said secondary winding, a second rectifier and small value smoothing capacitor connected to said secondary winding to produce an initial operating low voltage, and an integrated control circuit chip electrically connected to receive and use said initial operating low voltage to begin generating and putting out switching pulses, and isolation circuit means for transferring said switching pulses to the gate of the transistor after the transistor has stopped conduction following said declining voltage level.

18. The isolated-output switching power supply set forth in claim 17 wherein the transformer has a second secondary winding and further comprising a third rectifier for producing a second secondary voltage, and a current-limiting network comprising a third capacitor, a first inductor, and a fourth smoothing capacitor for initially isolating an output load of the power supply from the second secondary winding during an initial startup interval and for thereafter filtering and providing said second secondary voltage as regulated DC power to the load.

19. The isolated-output switching power supply set forth in claim 18 further comprising an output level monitor connected in a network including the second secondary winding and third rectifier, and wherein the integrated control circuit chip is electrically connected to the output level monitor and regulates duty cycle of the switching pulses in relation to monitored output level of the power supply flowing to the load.

20. An isolated-output switching power supply comprising a transformer having a primary winding and a secondary winding, a first rectifier for rectifying input power from AC mains, a series network including the primary winding and a source-drain path of a switching field effect transistor, a resonant circuit network connected to a gate of the transistor to cause said transistor to self-oscillate during an initial power-on interval so that the transistor transfers input alternating current through the primary and into a core of the transformer, said energy stored in the core of the transformer thereupon being transferred to said secondary winding, a second rectifier and small value smoothing capacitor connected to said secondary winding to produce an initial operating low voltage, and an integrated control circuit chip electrically connected to receive and use said initial operating low voltage to begin generating and putting out switching pulses, and isolation circuit means forming a part of said resonant circuit network for transferring said switching pulses to the gate of the transistor and causing said transistor to stop self-oscillation following said initial power-on interval.

21. For use within a switching power supply having an input side isolated from an output side by a power transformer, the primary side including a primary winding of the power transformer, a first rectifier and filter for rectifying and smoothing alternating current from power mains to provide primary direct current, a MOSFET switch having a source and drain current path in series with the primary winding and having a gate circuit, starting circuit means for causing the MOSFET switch to transfer energy through a core of the power transformer during an initial startup interval, the secondary side including a first secondary network having a first secondary winding and a second rectifier and filter for rectifying and smoothing said energy into a low level operating voltage, a low voltage current control integrated circuit for generating control pulses for controlling the gate circuit upon receiving the low level operating voltage, the secondary side further including a second secondary network having a second secondary winding and a third rectifier, isolator and filter for rectifying, initially isolating during the initial startup interval and then filtering and smoothing energy from the transformer into an output power for application to an external load, the integrated circuit comprising:

- low level operating voltage monitoring means connected to monitor the level of operating voltage supplied from said first secondary network,
- linear control means connected to add capacitance of an external capacitor to said second rectifier and filter as operating voltage level increases during the initial startup interval,
- output power monitoring means for monitoring the output power for application to the external load, and
- width-modulated pulse generation means for generating recurrent control pulses having widths controlled by monitored output power, for application through isolation circuit means to the gate of the MOSFET switch.

22. The integrated circuit set forth in claim 21 wherein the output power monitoring means includes voltage monitoring means and current monitoring means.

23. For use within a switching power supply having an input side isolated from an output side by a power transformer, the primary side including a primary winding of the power transformer, a first rectifier and filter for rectifying and smoothing alternating current from power mains to provide primary direct current, a MOSFET switch having a source and drain current path in series with the primary winding and having a gate circuit, starting circuit means for causing the MOSFET switch to transfer energy through a core of the power transformer during an initial startup interval, the secondary side including a first secondary network having a first secondary winding and a second rectifier and filter for rectifying and smoothing said energy into a low level operating voltage, a low voltage current control integrated circuit for generating control pulses for controlling the gate circuit upon receiving the low level operating voltage, the secondary side further including a second secondary network having a second secondary winding and a third rectifier, isolator and filter for rectifying, initially isolating during the initial startup interval and then filtering and smoothing energy from the transformer into an output power for application to an external load, the integrated circuit comprising:

- output voltage-monitoring means for monitoring the output voltage for application to the external load to provide a voltage control,
- output current monitoring means for monitoring the output current drawn by the external load to provide a current control,
- internal switch means for switching between the voltage control and the current control,
- pulse generation means for generating recurrent control pulses, comparator means responsive to the switch-selected voltage control or current control for putting out control pulses having widths controlled by monitored output voltage or current, for application through isolation circuit means to the gate of the MOSFET switch,
- latched over-current sensing means for sensing secondary side overcurrent on a cycle-by-cycle basis and for inhibiting output of said control pulses when an over-current is sensed, and
- reset means responsive to a power-on enable logical signal for resetting said latched over-current sensing means following inhibition of said control pulses.

24. The switching power supply set forth in claim 23 wherein the external load comprises a battery undergoing charging and wherein the output current monitoring means includes trickle current switching means for enabling sensing of a plurality current flows through said secondary winding including a trickle current flow through said battery.

* * * * *